United States Patent
Iskrev et al.

(10) Patent No.: US 10,423,167 B2
(45) Date of Patent: Sep. 24, 2019

(54) SYSTEM AND METHOD FOR AUTOMATED LANDING OF AN UNMANNED AERIAL VEHICLE

(71) Applicant: Uvionix Aerospace Corporation, Rancho Cordova, CA (US)

(72) Inventors: Yordan Iskrev, Rancho Cordova, CA (US); Boris Iskrev, Rancho Cordova, CA (US)

(73) Assignee: UVIONIX AEROSPACE CORPORATION, Rancho Cordova, CA (US)

( * ) Notice: Subject to any disclaimer, the term of this patent is extended or adjusted under 35 U.S.C. 154(b) by 96 days.

(21) Appl. No.: 15/493,259

(22) Filed: Apr. 21, 2017

(65) Prior Publication Data

US 2017/0308100 A1    Oct. 26, 2017

Related U.S. Application Data

(60) Provisional application No. 62/326,998, filed on Apr. 25, 2016.

(51) Int. Cl.
*G05D 1/10* (2006.01)
*G05D 1/06* (2006.01)
*B64C 39/02* (2006.01)

(52) U.S. Cl.
CPC ......... *G05D 1/0676* (2013.01); *B64C 39/024* (2013.01); *G05D 1/10* (2013.01);
(Continued)

(58) Field of Classification Search
CPC ...... G05D 1/0676; G05D 1/10; B64C 39/024; B64C 2201/128; B64C 2201/141; B64C 2201/146
See application file for complete search history.

(56) References Cited

U.S. PATENT DOCUMENTS 8,068,950 B2    11/2011 Duggan et al.
9,817,396 B1*   11/2017 Takayama ............ G05D 1/0038
(Continued)

FOREIGN PATENT DOCUMENTS

CN    104600902    5/2015
EP    2193993      6/2010
(Continued)

OTHER PUBLICATIONS

International Search Report and Written Opinion for Application No. PCT/US2017/029082 dated Aug. 10, 2017.
(Continued)

*Primary Examiner* — Genna M Mott
(74) *Attorney, Agent, or Firm* — Grogan, Tuccillo & Vanderleeden, LLP

(57) ABSTRACT

A system for the automated landing of an unmanned aerial vehicle includes an unmanned aerial vehicle having a control module, a first remote control device located at a remote location and controllable by a pilot, the first remote control device being configured to communicate with the unmanned aerial vehicle, and a second remote control system device located at a landing area and controllable by an observer, the second remote control device being configured to communicate with the unmanned aerial vehicle. The first remote control device and the second remote control device are configured for continuous communication with the unmanned aerial vehicle for landing of the unmanned aerial vehicle at a landmark at the landing area.

18 Claims, 3 Drawing Sheets

(52) U.S. Cl.
  CPC .. *B64C 2201/128* (2013.01); *B64C 2201/141* (2013.01); *B64C 2201/146* (2013.01); *B64C 2201/18* (2013.01)

(56) References Cited

U.S. PATENT DOCUMENTS

| | | |
|---|---|---|
| 2010/0140415 A1 | 6/2010 | Goossen |
| 2015/0298799 A1 | 10/2015 | Bertrand et al. |
| 2017/0045894 A1* | 2/2017 | Canoy .................. G05D 1/0676 |
| 2017/0269590 A1* | 9/2017 | Feng ..................... B64C 39/024 |

FOREIGN PATENT DOCUMENTS

| | | |
|---|---|---|
| EP | 2551198 | 1/2013 |
| WO | 2015135951 A1 | 9/2015 |
| WO | 2015177376 A1 | 11/2015 |

OTHER PUBLICATIONS

Supplementary Partial European Search Report For Corresponding EP Application No. 17790179.0 dated Mar. 6, 2019.

* cited by examiner

SYSTEM AND METHOD FOR AUTOMATED LANDING OF AN UNMANNED AERIAL VEHICLE

CROSS-REFERENCE TO RELATED APPLICATIONS

This application claims the benefit of U.S. Provisional Application Ser. No. 62/326,998, filed on Apr. 25, 2016, which is hereby incorporated by reference herein in its entirety.

FIELD OF THE INVENTION

The present invention relates generally to aerial vehicles and, more particularly, to a system and method for the automated landing of unmanned aerial vehicles.

BACKGROUND OF THE INVENTION

An unmanned aerial vehicle (UAV), commonly known as a drone, is an aircraft without a human pilot aboard. Its flight is controlled either autonomously by onboard computers or by the remote control of a pilot on the ground or in another vehicle. UAVs are commonly used in military and special operations applications, and are increasingly finding uses in civil, commercial and recreational applications, such as policing and surveillance, aerial filming, and delivering of packages to end consumers.

In the course of a mission of an aircraft or unmanned aerial vehicle ("UAV"), regardless of the application, it is often desirable to land the aircraft on a pre-specified location, such as on the ground or on a moving vehicle or platform, in order to ensure safety of the personnel and/or property and/or to match a specific requirement of the mission. In many cases, the pre-specified landing location is beyond, or out of, the line of sight of a remote operator of the UAV.

In view of the above, there is a need for a system and method for the automated landing of an aircraft of UAV in a variety of landing scenarios.

SUMMARY OF THE INVENTION

It is an object of the present invention to provide a system and method for the automated landing of an unmanned aerial vehicle.

It is another object of the present invention to provide a system and method for the automated landing of an unmanned aerial vehicle in a variety of landing scenarios.

It is another object of the present invention to provide a system and method for the automated landing of an unmanned aerial vehicle in a beyond-line-of-sight (BLOS) flight operation.

It is another object of the present invention to provide a system and method for the automated landing of an unmanned aerial vehicle for delivering packages to end consumers.

These and other objects are achieved by the present invention.

According to an embodiment of the present invention a system for the automated landing of an unmanned aerial vehicle includes an unmanned aerial vehicle having a control module, a first remote control device located at a remote location and controllable by a pilot, the first remote control device being configured to communicate with the unmanned aerial vehicle, and a second remote control system device located at a landing area and controllable by an observer, the second remote control device being configured to communicate with the unmanned aerial vehicle. The first remote control device and the second remote control device are configured for continuous communication with the unmanned aerial vehicle for landing of the unmanned aerial vehicle at a landmark at the landing area.

According to another embodiment of the present invention, a method for the automated landing of an unmanned aerial vehicle includes controlling an unmanned aerial vehicle from a takeoff point to a point generally vertically above a landing area, capturing a photograph of the landing area from the unmanned aerial vehicle, transmitting the photograph to a first remote control device located near the landing area, prompting an observer to select a landing point on the photograph via the first remove control device, calculating a reference trajectory for a landing phase in dependence upon a location of the unmanned aerial vehicle in relation to the selected landing point, and controlling movement of the unmanned aerial vehicle to the landing point according to the calculated reference trajectory.

According to yet another embodiment of the present invention, a system for the automated landing of an unmanned aerial vehicle includes an unmanned aerial vehicle having a control module and a detector communicatively coupled to the control module and a first remote control device configured to communicate with the unmanned aerial vehicle. The detector is configured to capture a photograph of a landing area for transmission to the first remote control device. The first remote control device enables selection of a landing point for the unmanned aerial vehicle on the photograph. The control module is configured to autonomously control descent of the unmanned aerial vehicle to the landing point.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

According to an embodiment of the present invention, a system and method for the automated landing of an unmanned aerial vehicle is provided. In connection with the present invention, the following terms are utilized:

Onboard—descriptor of a module or an equipment attached to the UAV while in flight.

Takeoff point—the point in space at which the UAV is positioned by its operator before it lifts off in the air.

Landing point—the point in space at which the observer desires the UAV to touch the ground (or the moving platform) during landing.

Landing area—the area of at least approximately 30 feet immediately around the landing point. The dimensions of the landing are defined by the UAV operator in a way to ensure safety of people, animals and property during landing of the UAV.

Liftoff/Takeoff Switch Point—the point in space, vertically above the takeoff point, at the maximum altitude that an onboard ground (or platform) ranging module is able to measure (SONAR, RADAR, LIDAR, etc), if such ranging module is used. If a ranging module is not used, the Liftoff and Takeoff will be one and the same flight stage. The Stage of Flight changes from Liftoff to Takeoff at the Liftoff/Takeoff Switch Point.

Takeoff/Cruising Switch Point—the point in space, vertically above the takeoff point at the cruising altitude, as defined by the UAV operator. The stage of flight changes from takeoff to cruising at the takeoff/cruising switch point.

Cruising/Landing Switch Point—the point in space, vertically above the landing point, at the cruising altitude, as defined by the UAV operator. The stage of flight changes from cruising to landing at the cruising/landing switch point.

Landing/Touchdown Switch Point—the point in space, vertically above the landing point, at the maximum altitude that an onboard ground (or platform) ranging module is able to measure (SONAR, RADAR, LIDAR, etc), if such ranging module is used. If a ranging module is not used, the landing and touchdown will be one and the same flight stage.

For the purposes of describing the present invention the following definitions of the different stages of the flight are utilized herein:

Liftoff—the predominantly vertical flight path from the takeoff point to the liftoff/takeoff switch point.

Takeoff—the predominantly vertical flight path from the liftoff/takeoff switch point to the takeoff/cruising switch point.

Cruising—the predominantly horizontal flight path (linear direct route or via a number of waypoints) from the takeoff/cruising switch point to the cruising/landing switch point.

Landing—the predominantly vertical flight path from the cruising/landing switch point to the landing/touchdown switch point.

Touchdown—the predominantly vertical flight path from the landing/touchdown switch point to the landing point.

Figure 1:
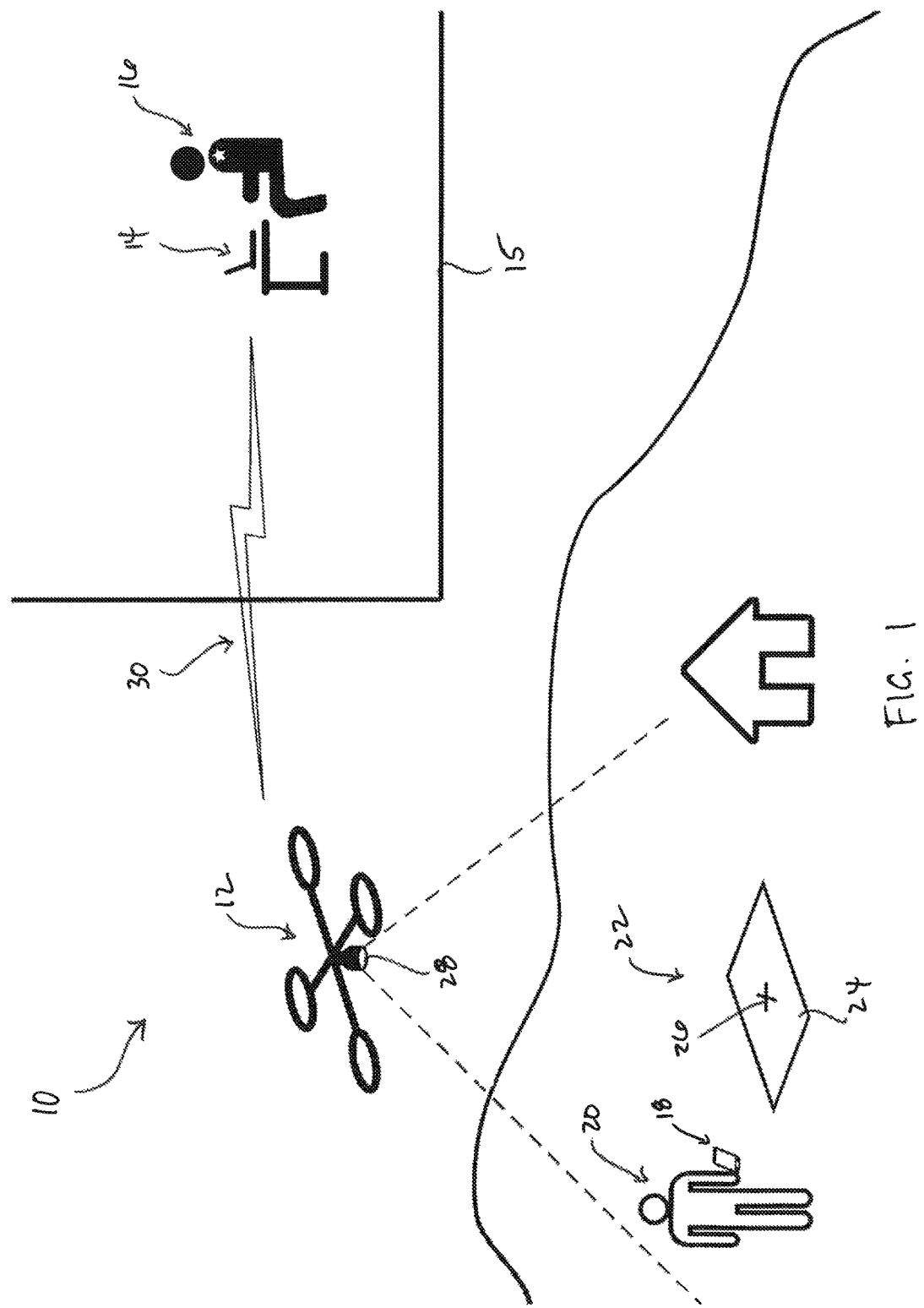
FIG. 1 is a simplified, schematic illustration of a system for the automated landing of an unmanned aerial vehicle, according to an embodiment of the present invention.

With reference to FIG. 1, according to an embodiment of the present invention, a system 10 for the automated landing of an unmanned aerial vehicle is provided. The system 10 includes an unmanned aerial vehicle 12, a first remote control system 14 residing at a remote location 15 (such as with a pilot 16), and a second remote control system 18 residing at a landing area (such as with an observer 20). The landing area 22 may include a landmark 24 and a landing point 26.

The unmanned aerial vehicle 12 is preferably an unmanned vertical takeoff and landing aircraft (VTOL) and is equipped with a control module having one or more hardware processors/microcontrollers, all operating separately or interconnected, running a collection of embedded computer software, including the a landing algorithm, as discussed in detail below. A notable software component, needed for but not part of this invention, is the availability of a reference trajectory following algorithm running in the control module. This algorithm ensures that once preset with a reference trajectory, it will calculate the necessary attitude angles and level of thrust of the UAV 12, such that the reference trajectory is closely followed.

The UAV 12 further includes one or more electromagnetic wave detectors 28. The electromagnetic wave detectors 28 may be, for example, a visual or multispectral camera or detector, used to search for and track the position of a landmark, e.g., landmark 24 relative to the camera/detector 28. Data from the electromagnetic wave detectors 28 is preferably interfaced to and processed by the control module of the UAV 12. Pictures (diagrams) and/or video from electromagnetic wave detectors 28 can be transmitted to an observer, e.g., observer 20, and to the pilot, e.g., pilot 16, at appropriate points of time, e.g., over a wireless communication link 30, as described in detail below.

In an embodiment, the electromagnetic wave detectors 28 may be equipped with a wavelength filter, in order to increase the signal-to-noise (SNR) ratio of the measured signal and thus facilitate more robust and resilient detection and tracking of the landmark 24. The electromagnetic wave detectors 28 may or may not be attached to an optical image stabilization device, known as "gimbal", which apart from decreasing the noise in the observed signal, may offer capabilities to alter the orientation of the electromagnetic wave detectors 28 relative to the UAV 12, thus enabling the electromagnetic wave detectors 28 to observe a broader area, without changing the attitude of the UAV 12.

The UAV 12 further includes communication equipment or modules capable of establishing bi-directional data exchange between the UAV 12 and the observer's remote control equipment 18 and the pilot's remote control equipment 14. Examples of the technical communication systems in such modules include, but are not limited to Bluetooth LTE or Classic, WiFi, GPRS, 2/3/4G, and LTE modules.

As used herein, the landmark 24 for the UAV 12 referred to above is an identifiable object (or pattern), positioned (or located) on the ground or attached to a moving vehicle/platform, such that the presence and relative position of the landmark 24 can be detected by the electromagnetic wave detector(s) 28 of the UAV 12. The landmark 24 denotes the exact position of the landing point 26, as specified by the observer 20. In an embodiment, the landmark 24 can include unique identification features, enabling the UAV 12 to distinguish it from other landmarks. In certain embodiments, the landmark 24 may include communication features, such that it can communicate with the UAV 12. The landmark 24 need not be a purposely positioned object, but could also be a pre-existing feature of the landing area 22 of the ground (or moving platform), such that the landing algorithm can identify it during an identification phase of the landing algorithm, and distinguish it from the other features of the environment during landing.

Figure 4:
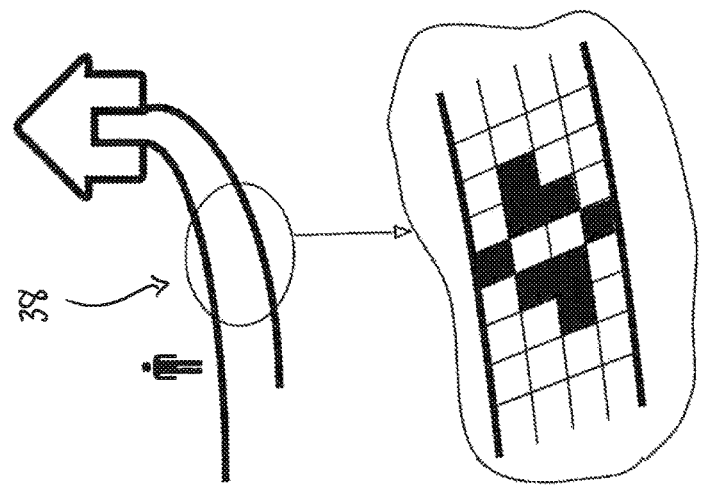
FIG. 4 is a perspective illustration of another type of landmark used by the system of FIG. 1.
Figure 3:
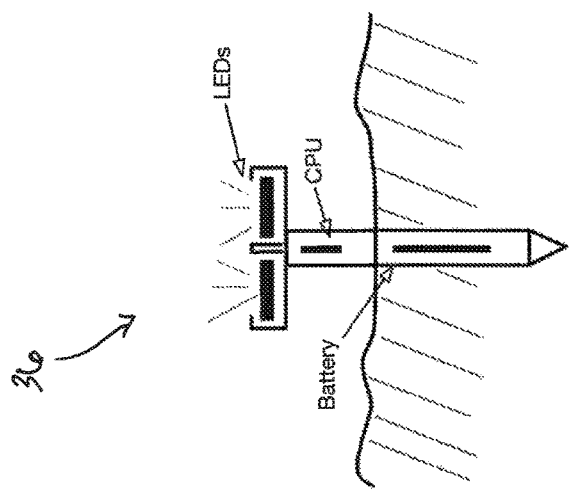
FIG. 3 is a perspective illustration of a LED based landmark used by the system of FIG. 1.
Figure 2:
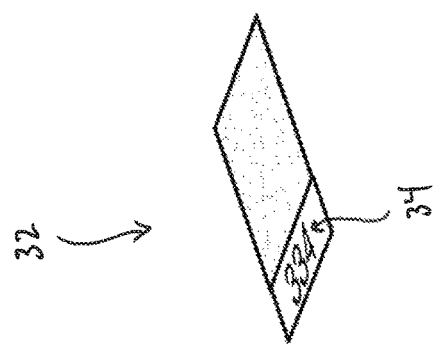
FIG. 2 is a perspective illustration of a first type of landmark used by the system of FIG. 1.

In various embodiments, the landmark may include a rectangular board 32 having a polymer foil containing high-contrast pre-printed images, as shown in FIG. 2. The high-contrast pre-printed images may be completely or partly 2D barcodes. The pre-printed images may include identification information 34, either encoded in the 2D barcode or in clear text. In other embodiments, the landmark may include a light-emitting-diode (LED) equipped device 36, shown in FIG. 3, emitting light pulses (according to a pre-agreed communication protocol, known both by the landmark and the UAV 12), such that the UAV 12 can receive the data stream transmitted by the landmark. Importantly, this serves dual purposes: it facilitates the landing algorithm to distinguish the landmark from the surrounding environment and establish its relative position to the UAV 12, and encodes unique identification information of the landmark platform. In an embodiment, the landmark may include an electromagnetic wave emitter configured to emit electromagnetic waves for detection by the electromagnetic wave detector 28 on-board the UAV 12. In yet other embodiments, the landmark may be a collection of natural and/or artificial features of the terrain 38, which are suitable for machine recognition/fingerprinting, as shown in FIG. 4.

As alluded to above, the system 10 of the present invention may include remote control equipment 18 adjacent to the landing area 22 that is controllable by an observer 20. The observer 20 is there to directly observe the motion of the UAV 12 during landing and touchdown. In an embodiment, the observer 20 operates a system/equipment 18 for remote operational control over the motion of the UAV 12. In a UAV delivery scenario, the observer 20 could be the final consumer, customer or recipient of a package carried by the UAV 12. It is contemplated that the observer 20 is present to ensure the safety of the landing location 22 which includes ensuring no people, animals or property are positioned, and there is no risk to become positioned during landing, near the landing point 26, and ensuring that the landing point 26 lies on a flat and horizontal surface, either stationary with respect to ground or moving with a constant speed (if the landing point is defined on a moving vehicle), has a sufficient area and unobstructed passage to and view of the sky and conforms to any other requirements the pilot or the operator may have. The observer 20 is also present to select the landing point 26 and physically position the landmark 24 over the landing point 26 (if the landmark is an object), to pinpoint the position of the landmark 24 on the observer's remote control equipment 18 at the appropriate point of time, to observe the physical descent of the UAV 12 during the landing and touchdown flight stages and, in case an emergency/dangerous situation appears during landing/touchdown, to actuate an emergency function of the observer's remote control equipment 18 to signal the UAV's control module to stop (and reverse) the motion of the UAV 12.

The observer's remote control system/equipment 18 may be implemented as either a standalone electronic device or as a software application, operating on a smart device, such as a smartphone or a tablet, providing a user interface, and a number of functional capabilities. These capabilities include an emergency function that can be initiated to halt and optionally reverse the motion of the UAV 12, and a landmark selection function that is operable to specify the exact location of the landing point/landmark 26 and transmit this location to the control module of the UAV 12 for use by the landing control algorithm. In addition, the remote control equipment 18 is configured to receive and display to the observer 20 an aerial view of the landing area 22 as photographed by the onboard electromagnetic wave detectors 28 of the UAV 12. In an embodiment, the observer 20 may be the same person as, or different from, the pilot 16.

As referred to herein, the pilot 16 is a person providing clearance and monitoring the landing of the UAV 12. The primary functions of the pilot 16 are to monitor the descent of the UAV 12 during landing and touchdown, to check the correct initial detection of the landmark 24 (identification phase) by the landing algorithm, visually observe a remote transmitted image of the landing area 24 for potentially dangerous objects or circumstances, which may potentially cause damage to persons or property, approve or authorize the start of the landing stage of the flight at the cruising/landing switch point, and monitor the correct tracking of the landmark 24 by the UAV control module and landing algorithm during landing and touchdown. In addition, the pilot 16 is present to, in case an emergency/dangerous situation appearing during landing/touchdown, use the emergency function of the pilot's remote control equipment 14 to signal the UAV's control module to stop (and reverse) the motion of the UAV.

In an embodiment, the pilot 16 may or may not be the same person as the observer 20, and will typically reside at a remote location 15. Depending on the requirements of the operator, the pilot 16 may need to have obtained an appropriate qualification. As alluded to above, the pilot 16 is equipped with a remote control system/equipment 14 that can be implemented as either a standalone electronic device or as a software application, operating on a CPU containing device, such as a computer, smartphone or tablet, providing a user interface, and a number of control capabilities to the pilot 16. These include stopping and optionally reversing the motion of the UAV 12, restarting the landing process, and receiving and showing to the pilot an aerial view of the landing area 22 as photographed by the onboard electromagnetic wave detectors 28 of the UAV 12 (which can be a motion video or a still image). The pilot remote control equipment 14 may include a landmark selection function, which is used to specify the exact location of the landing point/landmark 22 and transmit it to the control module of the UAV 12 for use by the algorithm. This can be utilized in case the observer 20 has difficulties selecting the landmark on his/her own. The pilot remote control equipment 14 also includes a landmark selection alteration function which, in case the pilot 16 decides that an inappropriate landing point/landmark 26 is selected by the observer 20, can be used to select another landing point.

As also noted above, the landing algorithm used by the control module of the UAV 12 is an onboard software component, which is responsible for controlling the UAV 12 during an identification phase, a landing trajectory planning phase, and a tracking and positioning phase. The identification phase includes the initial detection of the landmark 24 based on the pinpointed location of the landmark 24 on the aerial photograph, and detecting the landmark's existence and relative position to the UAV 12. During the landing trajectory planning phase, depending on the relative position of the aircraft to the landmark and the desired landing strategy, the landing algorithm calculates a reference/planned landing trajectory for the landing and touchdown stages of flight, which should be followed by the aircraft to reach the position of the landing platform. In an embodiment, the trajectory may be calculated in a number of ways, for example, horizontal positioning of the UAV 12 directly above the landmark and then vertical motion until touchdown. This system is advantageous to minimally disrupt the motion of other nearby UAVs and is appropriate when landing on the ground with minimum environmental disturbances (e.g., wind). It can also use a straight-line trajectory which is generated between the cruising/landing switch point and the position of the landmark 24. This type of trajectory has advantages in cases of landing on a moving vehicle and in case of high level of environmental disturbances, since the trajectory is easier to recalculate. In an embodiment, the planned landing trajectory may be recalculated multiple times during landing, in the case where the actual motion of the UAV 12 significantly deviates from the trajectory.

During the tracking and positioning phase, once the initial detection of the landmark is confirmed, relative to the aircraft, and the landing stage of the flight has been initiated, the landing algorithm continuously re-detects the relative positions of the landmark 24 in reference to the UAV 12 and compares it to the planned landing trajectory. When any deviation from the actual motion to the planned/reference trajectory are found, the landing algorithm sends a control corrective action to the UAV motion/position/attitude control algorithms to alter the motion of the UAV 12, such that the planned landing trajectory is followed.

Finally, an operator may oversee the entire system, and who may be the person or company responsible for the overall UAV flight mission, and is responsible for determining safety and operational flight parameters.

Figure 5:
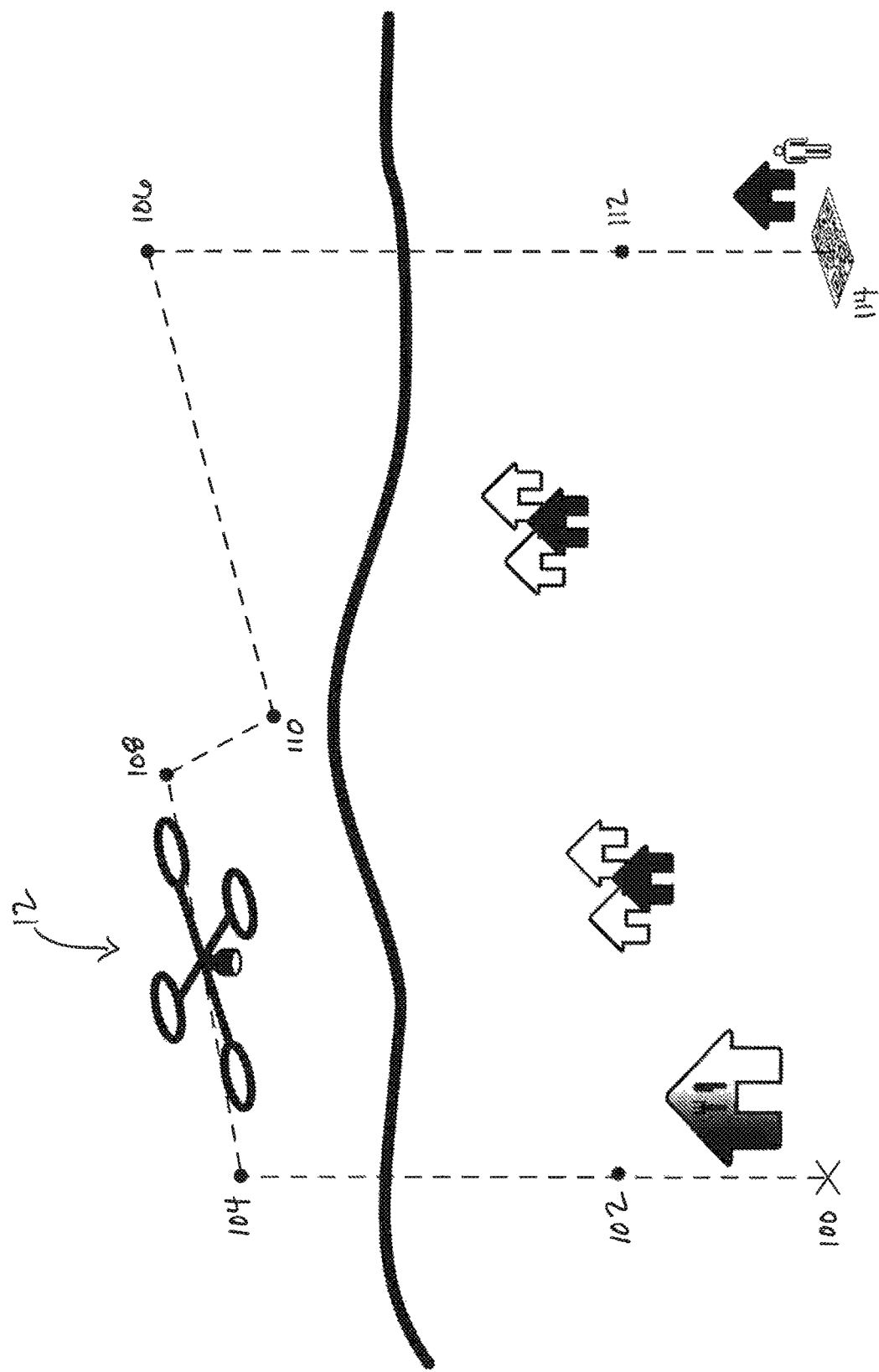
FIG. 5 is a schematic illustration of the system of FIG. 1, showing the various stages of flight of an unmanned aerial vehicle.

With reference to FIG. 5, in operation, the UAV 12 may be controlled, via the control module under direction from the pilot 16, from the takeoff point 100, to the liftoff/takeoff switching point 102, to the takeoff/cruising switching point 104, and to the cruising/landing switching point 106 via one or more waypoints 108, 110. In the preferred embodiment, however, control of the UAV 12 from the takeoff point to the cruising/landing switching point may be completely autonomous. The UAV 12 is then controlled from the cruising/landing switching point 106, to the landing/touchdown switching point 112, and ultimately to the landmark 114.

Once the UAV 12 has arrived at the cruising/landing switching point 106, i.e., horizontally near the landing point and the position of the observer, landing may be commenced. During this process, the electromagnetic wave detector(s) 28 on board the UAV 12 capture and send through its electrical interface to the control module a still aerial photo of the landing area. The UAV control module transmits via its wireless connection to the observer's remote control equipment 18 the still photo. The observer's remote control equipment 18, through its user interface (UI), displays to the observer 20 the received photo and alerts (sound and/or visual alert) the observer 20 to select the landing point/landmark 26. The observer 20, after following the operator's procedure, checks the safety of the area and the availability of a sufficiently unobstructed path to the sky from the landmark 24, selects using the observer's remote control equipment UI the location of the landmark/landing point 26 by selecting a point on the photo. The observer's remote control equipment 18 the transmits the selected point, as Cartesian X and Y coordinates relative to the upper left corner of the photo, to the control module of the UAV 12.

The control module runs the identification phase of the landing algorithm in order to determine, if the landmark 24 is an object at the landing point 26, whether it can recognize a valid landing object, as per the set of requirements set forth by the operator for identifying a valid landmark and, if the landmark is a pre-existing feature on the ground, whether the landing algorithm's identification phase procedures can identify unique enough features of the landing point/landing area, which can be used for tracking the relative position of the UAV 12 to the landing point/landmark during the descent. (Whether the landmark should be an object or a pre-existing feature of the landing area, is to be set forth by the operator in advance.)

If the result of the identification phase is positive, i.e the landing algorithm was able to find a valid landmark 24 at the landing point, the control module of the UAV 12 transmits via its wireless connection to the pilot's remote control equipment 14 the same photo, together with the received X and Y coordinates of the selected landing point/landmark and information, showing that the landmark 24 has been successfully identified. If the result of the identification phase is negative, i.e. the landing algorithm was unable to find a valid landmark, the control module notifies the observer's remote control equipment 18 to ask the observer 20 for a new landing Point/landmark. Upon confirmation by the observer 20, the electromagnetic wave detector(s) 28 (via the control module) sends another photo of selection and identification repeats, the necessary number of times, until a valid landmark has been identified.

The pilot's remote control equipment 14, through its UI, displays to the pilot 16 the received photo and the selected landing point/landmark and alerts (sound and/or visual alert) the pilot to check the area and confirm the landing. The pilot 16 then examines the photo following the operator's procedure, and after ensuring there are no people, animals or objects possibly endangering the landing operation, using the UI of the pilot's remote control equipment 14 clears the landing commencement. The pilot's remote control equipment 14 transmits via its wireless connection to the UAV control module the clearance for commencement of the landing. If, for any reason, the pilot 16 deems the landing unsafe he/she may request the observer 20 to select another landing point/landmark (in this case the pilot's remote control equipment 14 transmits to the control module a request for repeating of the selection of the landmark and the control module transmits to the observer's remote control equipment 18, this request, together with a new photo of the landing area) or deny the landing altogether. If the landing clearance is received the landing algorithm switches to the landing trajectory planning phase and calculates the reference trajectory for descending.

After the reference trajectory has been calculated, the landing algorithm presents this trajectory to the trajectory following algorithm of the control module. The landing algorithm switches to the tracking and positioning Phase. During this phase the landing algorithm continuously re-identifies the relative position of the landmark 24 to the UAV 12, compares it to the reference trajectory and continuously feeds to the trajectory following algorithm the error between the expected and actual position of the UAV 12, in order for the trajectory following algorithm to take corrective action. In an embodiment, the tracking and positioning phase of the landing algorithm runs continuously through the landing and touchdown stages of the flight. During this process, the control module, in parallel to running the above algorithms, continuously transmits a live-streamed video from the electromagnetic wave detectors 28 of the UAV 12 to the pilot's remote control equipment 14 (the latter continuously displays this to the pilot), monitors for corrective actions, initiated from the pilot 16 through the UI of the pilot's remote control equipment 14 and wirelessly transmitted to the control module, which executes them if such are received, monitors for corrective actions, initiated from the observer through the UI of the observer's remote control equipment 18 and wirelessly transmitted to the control module, which executes them if such are received.

As indicated above, the present invention relates specifically to landing of an unmanned aerial vehicle. In the preferred embodiment, neither the pilot 16 nor the observer 20, or the respective control modules/control devices participate in takeoff and/or cruising, although such control from takeoff to the cruising/landing switching point is possible.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof.

Therefore, it is intended that the invention not be limited to the particular embodiments disclosed in the above detailed description, but that the invention will include all embodiments falling within the scope of this disclosure.

What is claimed is:

1. A system for the automated landing of an unmanned aerial vehicle, comprising:
an unmanned aerial vehicle having a control module;
a first remote control device located at a remote location and controllable by a pilot, the first remote control device being configured to communicate with the unmanned aerial vehicle and provide active control over the unmanned aerial vehicle; and
a second remote control device located at the landing area and controllable by an observer, the second remote control device being configured to communicate with the unmanned aerial vehicle and provide for passive control over the unmanned aerial vehicle;
wherein the first remote control device and the second remote control device are configured for continuous communication with the unmanned aerial vehicle for landing of the unmanned aerial vehicle at a landmark at the landing area;
wherein the unmanned aerial vehicle is configured to capture an image of the landing area and transmit the image to the second control device;
wherein the second remote control device is configured to allow for observer selection of the landmark and/or a landing point within the image for landing of the unmanned aerial vehicle, and to communicate the selected landmark and/ or landing point to the unmanned aerial vehicle;
wherein the unmanned aerial vehicle is configured to transmit the image and the selected landmark and/or landing point to the first remote control device; and
wherein the first remote control device is configured to allow for pilot review and clearance of the selected landmark and/or landing point.

2. The system of claim 1, wherein:
the unmanned aerial vehicle includes at least one on-board detector configured to detect and track a position of the landmark relative to the unmanned aerial vehicle.

3. The system of claim 2, wherein:
the detector is an electromagnetic wave detector.

4. The system of claim 2, wherein:
the detector is configured to capture the image of the landing area for processing by the control module.

5. The system of claim 1, wherein:
the landmark includes at least one of:
a board having high-contrast pre-printed images;
a mat;
a light emitting diode;
an electromagnetic wave emitter; and
a natural or artificial feature of terrain.

6. The system of claim 1, wherein:
the control module is configured to control movement of the unmanned aerial vehicle during an identification phase, a landing trajectory planning phase, and a tracking and positioning phase;
wherein in the identification phase the control module is configured to detect the landmark relative to a position of the unmanned aerial vehicle;
wherein in landing trajectory planning phase the control module is configured to calculate a planned landing trajectory for landing and touchdown stages of flight; and
wherein in the tracking and positioning phase, the control module is configured to continuously re-detect the relative positions of the landmark in reference to the unmanned aerial vehicle and compare it to the planned landing trajectory.

7. The system of claim 1, wherein:
the unmanned aerial vehicle is configured to carry a package for delivery to a consumer at the landing area.

8. A method for the automated landing of an unmanned aerial vehicle, comprising the steps of:
controlling an unmanned aerial vehicle from a takeoff point to a point generally vertically above a landing area;
with the unmanned aerial vehicle, capturing a photograph of the landing area from the unmanned aerial vehicle;
with the unmanned aerial vehicle, transmitting the photograph from the unmanned aerial vehicle to a second remote control device located near the landing area;
with the second remote control device, prompting an observer to select a landing point on the photograph using the second remote control device;
with the unmanned aerial vehicle, transmitting the photograph and the selected landing point to a first remote control device;
with the first remote control device, prompting a user to provide denial or clearance of the selected landing point prior to commencement of landing of the unmanned aerial vehicle;
with the unmanned aerial vehicle calculating a reference trajectory for a landing phase in dependence upon a location of the unmanned aerial vehicle in relation to the selected landing point; and
controlling movement of the unmanned aerial vehicle to the landing point according to the calculated reference trajectory.

9. The method according to claim 8, further comprising the step of:
with a control unit on-board the unmanned aerial vehicle, assessing the sufficiency of the selected landing point to function as a tracking feature during the landing phase.

10. The method according to claim 9, further comprising the steps of:
with the unmanned aerial vehicle, transmitting the photograph with the selected landing point to the first remote control device; and
with the first remote control device, requesting clearance from an operator of the first remote control device to proceed with landing of the unmanned aerial vehicle at the landing point.

11. The method according to claim 10, further comprising the steps of:
if clearance is received from the operator, automatically calculating the reference trajectory and initiating the landing phase; and
if clearance is not received from the operator, generating a prompt on the first remote control device to select a new landing point.

12. The method according to claim 10, further comprising the step of:
continuously transmitting a live-stream video of the landing point from the unmanned aerial vehicle to the second remote control device.

13. The method according to claim 10, further comprising the step of:

from one of the first remote control device and the second remote control device, initiating an emergency function whereby the landing phase of the unmanned aerial vehicle is interrupted.

14. The method according to claim 13, wherein:
upon initiation of the emergency function, the unmanned aerial vehicle reverses course.

15. The method according to claim 8, wherein:
movement of the unmanned aerial vehicle from the take-off point to the landing point is fully autonomous.

16. The method according to claim 8, wherein:
the unmanned aerial vehicle is configured to carry a package for delivery to a consumer at the landing area.

17. A system for the automated landing of an unmanned aerial vehicle, comprising:
an unmanned aerial vehicle having a control module and a detector communicatively coupled to the control module;
a first remote control device configured to communicate with the unmanned aerial vehicle;
a second remote control device configured to communicate with the unmanned aerial vehicle at the landing area;
wherein the detector is configured to capture a photograph of a landing area for transmission to the second remote control device;
wherein the second remote control device enables selection of a landing point for the unmanned aerial vehicle on the photograph;
wherein the unmanned aerial vehicle is configured to transmit the photograph and the selected landing point to the first remote control device;
wherein the first remote control device is configured to allow for review and clearance of the selected landing point prior to commencement of landing of the unmanned aerial vehicle; and
wherein the control module is configured to autonomously control descent of the unmanned aerial vehicle to the landing point.

18. The system of claim 17, wherein:
the control module is configured to calculate a reference trajectory for the descent in dependence upon a location of the unmanned aerial vehicle in relation to the selected landing point.

* * * * *